(No Model.) 2 Sheets—Sheet 1.
G. WESTINGHOUSE, Jr.
AUTOMATIC ELECTRIC CURRENT REGULATOR.
No. 245,591. Patented Aug. 9, 1881.
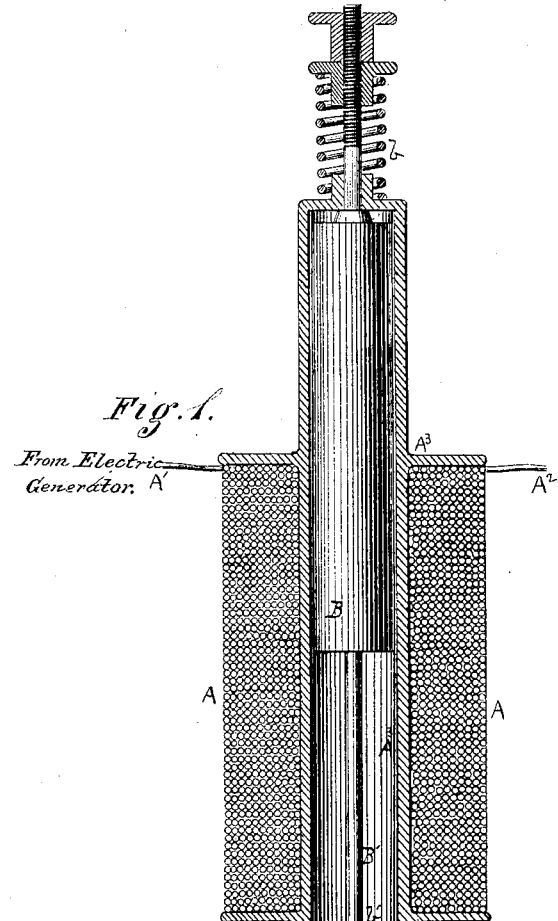
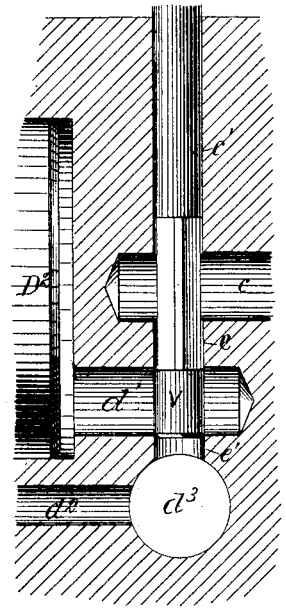
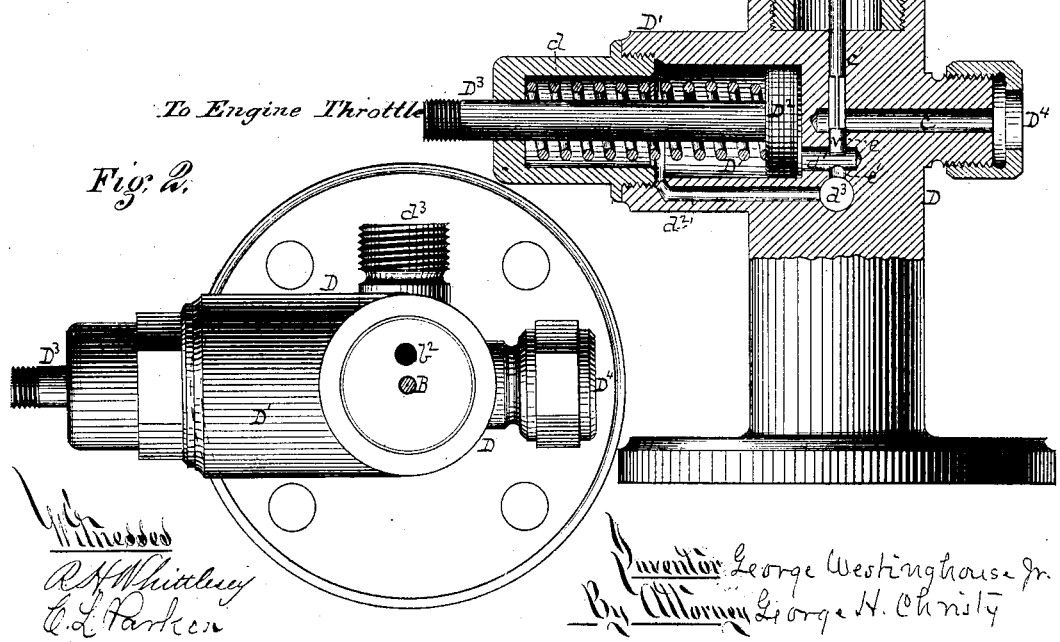

(No Model.) 2 Sheets—Sheet 2.
G. WESTINGHOUSE, Jr.
AUTOMATIC ELECTRIC CURRENT REGULATOR.
No. 245,591. Patented Aug. 9, 1881.
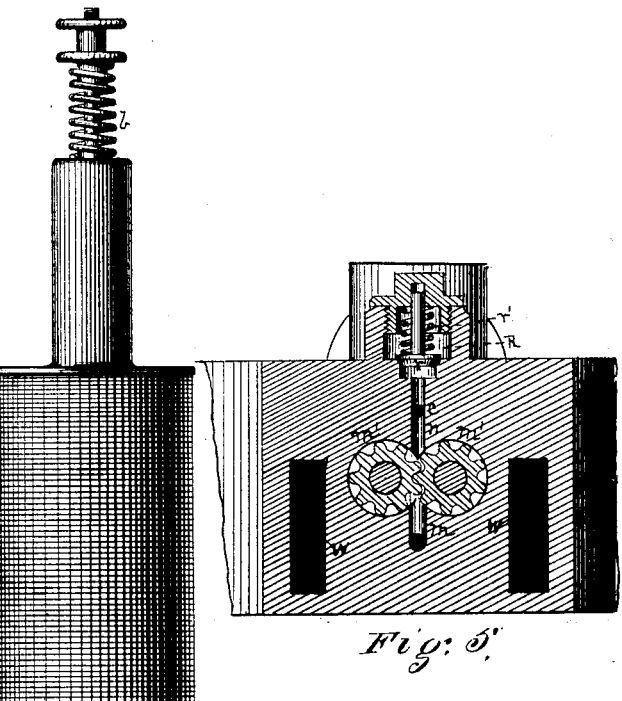
Fig. 5.
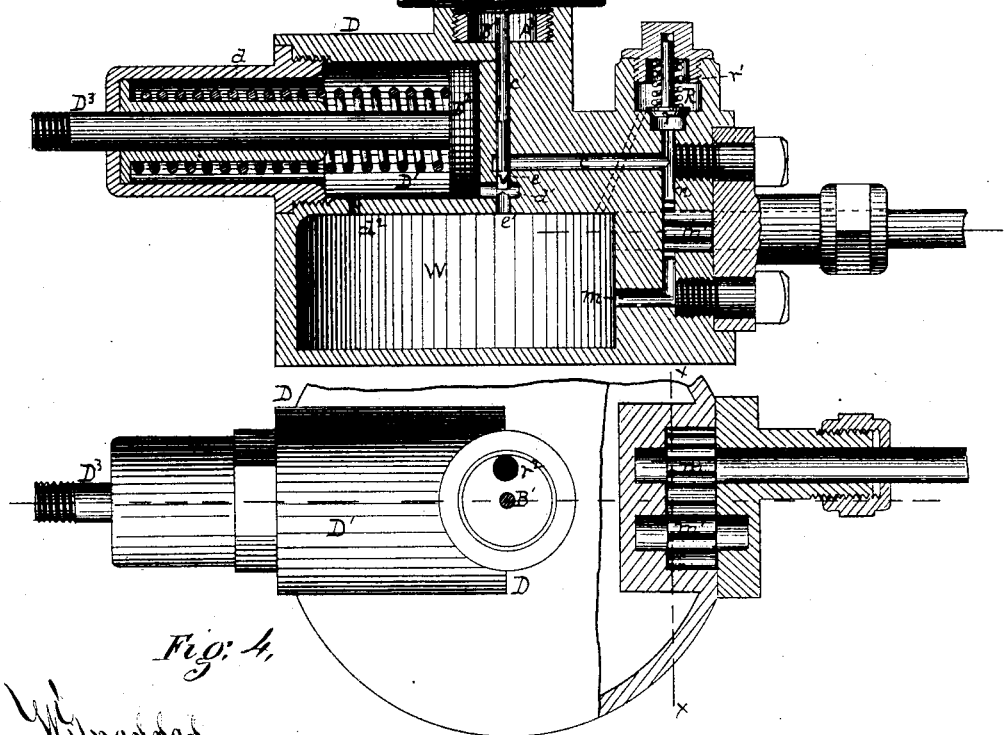
Fig. 3.
Fig. 4.
Witnesses
G. H. Whittlesey
C. L. Parker
Inventor George Westinghouse Jr.
By Attorney George H. Christy

UNITED STATES PATENT OFFICE.

GEORGE WESTINGHOUSE, JR., OF PITTSBURG, PENNSYLVANIA.

AUTOMATIC ELECTRIC-CURRENT REGULATOR.

SPECIFICATION forming part of Letters Patent No. 245,591, dated August 9, 1881.

Application filed May 31, 1881. (No model.)

*To all whom it may concern:*

Be it known that I, GEORGE WESTINGHOUSE, Jr., of Pittsburg, county of Allegheny, State of Pennsylvania, have invented or discovered a new and useful Improvement in Automatic Electric-Current Regulators; and I do hereby declare the following to be a full, clear, concise, and exact description thereof, reference being had to the accompanying drawings, making a part of this specification, in which—like letters indicating like parts—

Figure 1, Sheet 1, is a sectional view of an apparatus illustrative of my present invention. Fig. 2 is a top view of the case or box, the electro-magnet and its core being removed. Fig. 3, Sheet 2, is a view, partly in section and partly in elevation, illustrative of a modification thereof. Fig. 4 is a view, partly in plan and partly in section, of the apparatus of Fig. 3 with the electro-magnet removed; and Fig. 5 is a sectional view through the plane of the line $x\ x$, Fig. 4, looking to the left.

My present invention relates to certain improvements in electric apparatus, whereby the electric current itself, or a part thereof, is caused to actuate a valve or equivalent device, and by the movement thereof to turn on, cut off, regulate, or vary the force or power with which a fluid-pressure acting on a piston or equivalent diaphragm, and thence through suitable appliances, is caused to vary or change the quantity or force of an electric current on a lighting or other circuit, whereby with an increase or diminution in the number of lamps in the circuit, or of other devices for utilizing electric power, the quantity or force, or both, of the electric current which produces the light or gives the power will be correspondingly varied by the automatic action of the apparatus itself; and for the purposes of the present invention it is immaterial what movable or variable element of the apparatus is connected with the piston, whether it be the throttle or steam-regulating valve of the engine employed to drive the electric generator, or whether it be one or both of the field-magnets employed in such generator, or whether it be one or more switches, rheostats, shunt-circuits, or circuit-breakers; and for the purposes of the present invention I will use the term "generator" or "electric generator" as inclusive of "dynamo" and "magneto" electric machines of any known or desired form or construction, whether such machine generates or induces the current which produces the light or gives the power, or whether the light, where a light is used, is produced by the voltaic arc or by incandescence, or partly by one and partly by the other.

In my present description I will first assume that the piston referred to as actuated by fluid-pressure is connected by its stem (with or without other intermediate connections) with the throttle or other steam-regulating valve, the position of which, thus varied, regulates the supply of steam to the engine which drives the armature of the generator, so that as such throttle or other valve is moved toward an open or closed position the increase or decrease of steam-supply so effected will tend to increase or decrease the speed of the engine and of the revolving armature, and so affect the current; and in explanation of the invention I will first describe it as applied on a light-producing circuit.

Referring first to Figs. 1 and 2, A represents a coil or helix of wire, of size suitable for the purpose, which is in or forms a part of the lighting-circuit. For present purposes it may be assumed that the end A' leads from or is connected with the generator, and that the end A² leads to or is connected with the lamp or lamps. The remainder of the circuit is completed in any of the ways known to the art. The coil A is wound on any convenient tube or hollow support, A³, which should be a nonconductor or else be properly insulated.

Inside the cavity of the helix or coil A is a core, B, such as is adapted, on the sending of a current through the coil, to be actuated or operated on by the axial magnetic force so developed, as a result of which the core will be caused to enter or pass endwise farther within the coil, according to the force of the electric or electro-magnetic current, and a spring, $b$, is added, if need be, to secure its return or back motion or stroke on a cessation or diminution of the axial magnetic force consequent on a reduction of the current.

The tube A³ or other support for the coil is mounted on a case or box, D. This case has, as shown, a piston chamber or cylinder, D', within which is a piston, D², the stem D³ of which is connected with the throttle or valve which regulates or governs the supply of steam or other motive power to the engine employed to drive the generator, and in such manner (by preference) that one—say the outer—stroke or motion of the piston shall close or tend to close such throttle or valve, and the reverse or inward stroke or motion shall open or tend to open such throttle or valve, a spring, $d$, being added to effect such reverse stroke or motion.

From the port $D^4$ a pipe-communication is made to the boiler or steam-generator, by preference below the water-line, or with other source of fluid-pressure supply, controlled by or from the boiler or the engine. A port, $c$, from such boiler-connection $D^4$ enters or intersects with a hole, $c'$, which leads from the tube $A^3$.

In line with the hole $c'$, I make two ports, $e$ $e'$, and the adjacent ends of these two ports open into a passage, $d'$, which latter opens into the piston-chamber $D'$, back of the piston $D^2$. A port, $d^2$, opens from toward the forward end of the cylinder or piston-chamber $D'$ to a waste-port, $d^3$, which leads off as may be desired. The lower end of the port $e'$ also opens into the same waste.

Connected with the core B is a stem, $B'$, which enters the hole $c'$, passes through the adjacent end of the port $c$, and carries a piston-valve, $v$, which valve, when the coil A is not excited, or not sufficiently excited to produce any material effect, occupies the port $e$, and thereby cuts off from the cylinder $D'$ the pressure entering at $D^4$.

Starting, now, with the apparatus in the condition shown—that is to say, with the core B so balanced by the spring $b$ as against ordinary or the usual axial magnetism that the valve $v$ will keep the port $e$ closed, with the piston $D^2$ back, or so far back that the engine valve or throttle will be properly open for the supply of steam-pressure to the engine, so as to drive the generator approximately at normal speed, with reference to supplying the proper current for such number of lights as may be arranged in the circuit—if, now, steam-pressure be unduly or abnormally increased, so as to generate a stronger current than is desired, or in case one or more lamps are switched out of the circuit or are otherwise extinguished by accident or design, or if, for these or any other reasons, the current becomes abnormally strong, the result in any such case will be an increase in the force of the axial magnetism developed by the coil A, and this will result in moving the core B longitudinally along into the cavity of the coil a distance depending on the intensity or force of the axial magnetism so produced. This will result in shifting the position of the valve $v$ from its position in the port $e$ to a corresponding position in the port $e'$, as a result of which fluid-pressure, entering at the port $D^4$, will pass through $c$, $e$, and $d'$ to the cylinder $D'$, and so actuate the piston $D^2$ as to close partially the throttle or valve, and thereby lessen to a corresponding extent the speed of the engine and of the generator, and so lessen the current passing through the coil A, and correspondingly lessen the light-producing power of the electric current. The forces thus acting will almost instantaneously come to an equilibrium or balance, so that with the proper adjustments (which will come within the knowledge of the skilled constructer or operator) the current passing through the coil A will at all times produce such degree or amount of axial magnetism as will regulate or vary the position of the valve $v$ in such manner as to apply to or release or retain pressure on the piston $D^2$ in proper amount for holding the throttle or valve at the desired point (within proper limits of variation) for supplying to the engine the proper amount of steam for doing the work desired; and it will also be seen that as the current through the coil A is increased or lessened from any cause the position of the throttle or steam valve will be correspondingly and automatically changed, so as to increase the current when it is unduly lessened, and to lessen it when it is unduly increased; and with this explanation the operation will be readily understood in case one or more additional lights are switched on or otherwise brought into the circuit. The decrease of the axial magnetism will tend to cut off the fluid-pressure, let the piston come back, and open the throttle. The valve $v$ is, by preference, made a little less in length than the distance between the ports $e$ and $e'$, so that when the piston $D^2$ has been forced part way out, as described, so as partially to close the throttle, the valve $v$ may take a position intermediate between the ports $e$ $e'$, and, leaving both open, shall keep the supply and waste or exhaust slightly open, or practically so, as a result of which the throttle will be kept in the desired position. Then the least variation in the axial magnetism will make a correspondingly slight variation in the position of the throttle, so that, the fluid-pressure supply and exhaust being relatively varied, the current will be automatically varied accordingly; and, as a matter of fact, this intermediate position of the valve $v$ between the ports $e$ $e'$, occasionally, perhaps, closing one or the other for a brief instant, but for the most part keeping both open, more or less, is believed to be the adjustment or working position which will give the best results; and in the preferred mode of working the apparatus the forces employed should be adjusted, in their relationship to each other, with reference to this result. This feature of valve structure is more fully illustrated by a detached view to an enlarged scale in Fig. 6, Sheet 1.

So much of the stem $B'$ as plays through the ports $c$ and $e$ should be made of reduced size, so as to leave a free passage around it for the through-flow of fluid-pressure; also, as water may leak up around the stem $B'$, a flange, $b'$, may be added to keep it from spurting up against the core, and a waste-port, $b^2$, Fig. 2, should be added to carry off such water to the main waste $d^3$.

Instead of a piston-valve, $v$, and cylindrical ports $e\ e'$, other known forms of valve and ports may be employed, such as will perform the functions described, or such of them as may be desired, and any valve or combination of valves operated by axial magnetism produced by an electric current and arranged to open and close ports through which fluid-pressure may be supplied to a throttle or steam valve actuating piston is hereby included herein as the mechanical equivalent of the valve shown and described.

In Figs. 3 to 5 I have illustrated a modified construction of apparatus embodying the same invention for like use. Here I add a well, W, into which the ports $d^2$ and $e'$ discharge. This well is to be nearly filled with water. From its lower part a port, $m$, opens to a pumping-chamber, wherein are two rotary pumps, $m'$, of any desired construction, and which are to be driven at any predetermined speed from the same engine which drives the generator, or, if preferred, from a donkey-engine. The discharge-port $n$ opens into the port $c$, which latter is closed at its outer end, and in this way the fluid-pressure is produced and kept up instead of being taken from the steam-boiler, as before. As long as the port $e$ remains closed the pressure will simply be accumulated in the port $c$, but without producing any effect on the piston, and the water in the pumping-chamber will be carried around by the pumps. As soon as $e$ is opened, as above described, the operation will be the same as set forth. I prefer to add, however, a chamber, R, in which I arrange a pressure-relief valve, $r$, held down by a spring, $r'$, and adjusted as near as may be with reference to keeping up any desired predetermined working-pressure in the port $c$. Then, in case the pressure in $c$ exceeds such limit, the valve $r$ will be raised, and the excess of pressure will pass by the port $r^2$ to the well W.

While I have shown one form of pump, I do not limit myself thereto. Other suitable form or construction of pump may be employed, and, in fact, I show the pump chiefly to indicate more clearly the fact that in so far as relates to the present invention the source or manner of getting or accumulating the fluid-pressure is immaterial, as is also the kind of fluid-pressure employed. Any suitable fluid may be used—such as water, glycerine, oil, steam, air, &c.

It is not necessary that the coil A be arranged in the main or electric-light circuit, since it may be placed in a special or shunt circuit; also, a flexible diaphragm may take the place of the piston $D^2$, as the mechanical equivalent thereof.

While I have thus described with some degree of particularity the mode of using my present invention as a part of an electric-light circuit, I also include as of my invention its application as a governor or circuit-regulator to other than light-circuits, and, in fact, to all electric circuits generally in which power, subject to variation or change at different times in amount, force, or quantity, is taken off or utilized in the circuit. For example, an electric circuit may be employed to drive two or more dynamo or magneto electric machines, one or more of which may be switched on or off at different times. In such case switching on or off one machine will bring the governing apparatus into action in like manner as above described in switching on or off one of the supposed circuit-lights; and the same will be true in telegraphy, where a generator is employed instead of a battery or batteries to operate a number of circuits, either over the same or over different wires.

Switching on or off one or more circuits will cause the apparatus to act as a governor or regulator, and will, as in all the cases referred to, automatically change or vary the current, so that the effect or effects produced will be constant. Hence the invention herein described is claimed, generally, for all electric circuits, branching or continuous, where an effect is desired constant in kind but variable in amount, and wherein the flow of the current shall be automatically regulated according to the amount used. Nor in describing, as I have done, the organization and operation of this apparatus as combined with a steam-engine throttle, do I thus limit the scope of the present invention, but include herein as substitutes for the throttle, and for the purposes in view as its mechanical equivalents, other known means of varying the electric current, such as are capable of application or use by a piston or diaphragm motion. Thus, for illustration, the piston may be caused to work a switch, shunt-circuit, resistance-coil, rheostat, or other device in or connected with the circuit itself, such as are known in the art as means of varying electric currents in such manner that a piston stroke in one direction under the action of fluid-pressure shall automatically effect the desired variation in the current as transmitted to the place or places of use; or, again, the piston motion may be communicated to the field magnet or magnets of the generator so as automatically to vary their adjustment with reference to the armature, whereby a like effect will be produced. On the other hand, it is not absolutely essential that axial magnetism be employed to work the valve which regulates the supply and discharge of fluid-pressure to and from the piston, since it is a well-known fact that heat may be produced in an expansible rod, plate, or spring, or in a combination thereof, by the resistance which it offers to the passage of a current; and it will be readily understood that such element of expansibility, or, more broadly stated, the capacity of certain bodies or structures to change their shape or dimensions under the action of the heat produced by varying resistances offered to a variable current may be employed as a substitute for axial magnetism in the automatic actuating of the fluid-pressure valve or valves, and that this may be done by properly connecting such valve or valves with the rod or other device so acted on by the heat resulting from resistance; also, instead of making a mechanical connection from such resistance-piece to such valve, the former may be arranged in such relationship to a valve-moving rod, spring, or other structure capable of a change of shape or dimension under the action of heat that, imparting the heat of resistance to such rod or spring, the latter will, by suitable connection with the valve, properly regulate its motion with reference to the end in view; and for this purpose a siding or shunt circuit having a wire or coil of comparatively high resistance so as to produce heat may be employed. As all such and other like devices capable of producing a like effect are already well known in other branches of the same electric art, I do not deem it necessary to describe them in detail. Hence it will be understood that the only limitations which I place on my invention in the aspects of it last referred to are, that a valve taking its position from variations in an electric current shall govern the application of fluid-pressure to a piston or equivalent diaphragm, and that such piston or diaphragm shall, as a result of its motion, effect or tend to effect a reverse change in the light or power producing current, or shall tend to check or counteract the charge which affects the valve position; and, still further, the fluid-pressure may be caused to act continuously on one side of the piston while the apparatus is in normal condition for use, and the valve be shifted in any of the ways set forth, so as to vary, or even, if need be, cut off, such pressure, so as to vary the position of the piston, and through its action change or vary automatically the force or quantity of the current.

In the drawings I have not thought it necessary to indicate any necessary ratio of axial magnetic force to the force or quantity of the current or to the power of the spring $b$. The skilled constructer will have no difficulty in properly proportioning the different elements involved in the electrical part of the apparatus, and particularly the size and power of the coil A with reference to securing the operation and results described.

I claim herein as my invention—

1. The method of regulating an electric current by causing a valve the position of which is regulated by variations in an electric current to let on or off a previously-generated stored-up or accumulated fluid-pressure to a piston or equivalent diaphragm having means for connecting with a mechanism for automatically varying the force or quantity of the electric current, substantially as set forth.

2. An electric-current-regulator apparatus having in combination a mechanism for actuating a valve by means of variations in an electric current, a valve or valves adapted to be so actuated, a fluid-pressure supply and exhaust brought into and out of action by the movement or position of such valve or valves, and a piston or equivalent diaphragm through which to transmit motion automatically to a mechanism adapted in its action to effect a variation in the current, substantially as set forth.

3. In combination with ports $c$, $e$, and $e'$ and passage $d'$, a valve, $v$, adapted to be automatically varied in position by or from variations in an electric current, substantially as set forth.

4. In combination with an electrically-governed valve and a fluid-pressure cylinder and piston, a system of ports and passages, $c\ e\ e'\ d'\ d^2\ d^3$, relatively arranged, substantially as set forth, with reference to the automatic application and release of a fluid-pressure to change the electric current by its own variations.

5. In an electric-current-regulating apparatus, the combination of a helix or coil arranged in an electric circuit, a core operated thereby through axial magnetism, a valve operated from the core, a piston or equivalent diaphragm, and a fluid-pressure supply and exhaust brought into and out of action automatically by the movement or position of the valve, substantially as set forth.

6. In combination with an electrically-governed valve, a fluid-pressure cylinder and piston, and a system of intermediate ports and passages, a well, W, to receive the waste, and a pump to produce the pressure, substantially as set forth.

7. In combination with ports $e\ e'$ and intermediate passage, $d'$, a valve, $v$, suitably proportioned in length with reference to the distance between the adjacent ends of the ports $e\ e'$, substantially as set forth, whereby to vary the supply and discharge while both ports are open, as well as of closing either.

In testimony whereof I have hereunto set my hand.

GEORGE WESTINGHOUSE, JR.

Witnesses:
R. H. WHITTLESEY,
GEORGE H. CHRISTY.